Patented Jan. 27, 1948

2,435,159

UNITED STATES PATENT OFFICE 2,435,159

PROCESS OF STABILIZING FATTY MATERIALS CONTAINING OLEIC ACID AND HIGHER POLYUNSATURATED FATTY ACIDS

John Ross, Ramsey, N. J., assignor to Colgate-Palmolive-Peet Company, Jersey City, N. J., a corporation of Delaware No Drawing. Application June 30, 1944, Serial No. 543,049

9 Claims. (Cl. 260—413)

This invention relates to a new and useful process of treating oleic acid and oleic acid-containing material to improve the nature thereof, and, more particularly, to a process of treating such materials to reduce or eliminate the polyunsaturated acids.

Many fats and oils contain oleic acid and polyunsaturated fatty acids. The oleic acid finds extensive utility in numerous commercial products, but its desirability has been reduced by a tendency in such products to become rancid, to develop unpleasant odors, and to discolor. These undesirable characteristics are attributed to the presence of polyunsaturated fatty acids which change in color and odor, due, presumably, to their absorption of oxygen.

Commercial oleic acid is known to contain minor amounts of linoleic acid, as well as stearic acid. For many uses, pure or substantially pure oleic acid is highly desirable, but presently known methods of separating oleic and linoleic acids are so expensive to carry out that the purified oleic acid is prohibitive in cost.

Other numerous uses of fatty acid mixtures are well known where removal of the polyunsaturated fatty acids results in a considerably improved product. For example: Tallow is employed, alone or blended with other oils, in making commercial and industrial soaps; however, it contains a small quantity of polyunsaturated acid or acids. These polyunsaturated acids, when saponified, are less stable than the saturated and oleic acids in tallow, and the soaps containing tallow acids develop an unpleasant odor and yellow color and possess other properties, any one of which may disqualify the tallow soap for a particular use or uses.

Many efforts have been made to produce oleic acid in a pure state, but such oleic acid, when made into soap, gradually develops a malodorous condition and exhibits a change from the original white color. This is now believed to be due to the presence of a small quantity of polyunsaturated fatty acids which, by previous methods, have not been completely removed from the oleic acid. These polyunsaturated acid soaps absorb oxygen readily and form various oxygenated products.

It is an object of this invention to provide a process for producing stable oleic acid.

It is another object of this invention to provide a process for converting polyunsaturated fatty acids, admixed with oleic acid, to stable acids without affecting the oleic acid.

It is an additional object of this invention to provide a process for preparing oleic acid in a substantially pure state.

It is still another object of this invention to produce saturated fatty acids from polyunsaturated fatty acids without affecting the valuable oleic acid admixed with the polyunsaturated fatty acids.

Other objects will suggest themselves from a consideration of the disclosures hereinafter set forth.

It has now been discovered that when oils or fats containing both oleic acid and polyunsaturated fatty acids, or mixtures of oleic and polyunsaturated acids, are subjected to a temperature within the range of about 280° C. to about 305° C. in the presence of excess alkali, the polyunsaturated acids undergo a chemical change whereby they are converted to saturated fatty acids or to other stable acids, without the oleic acid being affected. The polyunsaturated fatty acids are converted to saturated fatty acids having two less carbon atoms for each of the double bonds in the polyunsaturated fatty acids. The temperature must not exceed the minimum conversion temperature of oleic acid, which is about 310° C.

Separation of linoleic acid from oleic is extremely difficult, which practically precludes the economical production of pure or substantially pure oleic acid. Now, by the process of this invention, if the alkali salts of these acids are subjected to a temperature within the range of about 280° C. to 305° C., or below the conversion temperature of oleic acid salt, the linoleic acid is converted to myristic acid and acetic acid, and the oleic acid is substantially unaffected. The oleic acid may then be recovered in a stable, pure or substantially pure state by known processes, e. g., by acidifying with dilute sulphuric acid, recovering the mixture of acids, and fractionally crystallizing the acids, or by other methods, such as neutralizing with a suitable lead compound to form lead soaps, and extracting with ether or other solvents which dissolve the lead oleate but not the other soaps.

In many instances the new mixture of fatty acids has particularly desirable properties and uses. This is again illustrated by commercial oleic acid, which contains oleic, linoleic and stearic acids. Both oleic and stearic acids are useful in soap compositions, but they usually are blended with coconut oil to increase the solubility and foaming or lathering properties of the final soap product. However, linoleic acid is undesirable in soaps, since it increases the tendency of soaps to become rancid and to discolor, and adds little or nothing to the foaming characteristics of the soaps.

When the linoleic acid in the commercial oleic acid is subjected to the process of this invention, it is substantially converted to myristic acid. The mixture of stearic, oleic and myristic acids may then be used in the manufacture of soap, alone or blended with other oils, fats or fatty acids. (The sodium or potassium acetate is easily removed by washing the soaps with a salt or lye solution.)

By subjecting tallow, neutralized with an alkali, to a temperature within the range of about 280° C. to about 305° C., in the presence of excess alkali, the linoleic acid is converted into myristic acid, and the soaps resulting therefrom are found to have more desirable properties for use in the production of soap than do soaps from untreated tallow. These soaps exhibit greater stability, both as to color and odor, than do soaps made from tallow not so treated. In addition, their foaming properties are improved.

By this process it is possible to convert the linoleic acid found in such fats and oils as palm oil, olive oil, and the like, to myristic acid, and thus impart a desirable property to the treated oil for use in the manufacture of commercial soaps in which the linoleic acid soaps would be undesirable. (Any other polyunsaturated fatty acids are also converted to saturated fatty acids having a smaller number of carbon atoms. Experimental results indicate that a polyunsaturated fatty acid is converted to a saturated fatty acid having two less carbon atoms for each double bond.) Acetic acid and hydrogen are also produced in the reaction. (The temperature of conversion of the polyunsaturated fatty acid is below that of oleic acid.) The resulting fatty acids are highly desirable for use in commercial soapmaking. Similarly, the polyunsaturated acids of menhaden oil, linseed oil, cottonseed oil, corn oil, and the like, may be eliminated or stabilized to provide mixtures of fatty acids more suitable for well-known purposes.

This process provides relatively scarce saturated fatty acids, such as myristic and lauric acids. By subjecting the acids from cottonseed oil, soybean oil, and other oils which include acids containing two double bonds in the molecule, to this process, those acids are converted to myristic acid, an acid which is of great utility but which is not found in nature in sufficient quantities to supply present demands. The myristic acid may be separated from the other acids, after treatment by this process, by fractional crystallization or fractional distillation or other known methods.

The following examples will serve to illustrate further the process of this invention, but it is to be understood that they do not in any way limit the invention.

*Example I*

One hundred grams of fatty acid esters made by alcoholysis from tallow were saponified in a stainless steel pot with 20 grams of a powdered alkali mixture (equi-molar quantities of KOH and NaOH) at approximately 210° C. When the saponification was complete, the bath temperature was raised to 300° C. One hundred fifty-nine grams more of the alkali mixture were added in small portions, and the bath was maintained between about 300° C. and about 315° C. (the temperature of the actual mixture being about 280° C. to 295° C.) for one-half hour after the addition of the final portion of alkali. When the reaction had cooled, the soaps and aqueous alkali were dissolved in hot water and the acids (69 grams) liberated by acidifying the solution with dilute sulphuric acid. These acids were neutralized with sodium hydroxide. After ageing, the resulting soaps exhibited a definite improvement in color and odor over soaps prepared from untreated acids from the same source.

*Example II*

A quantity of fatty acids from cottonseed oil was converted into methyl esters by alcoholysis or ester interchange. These esters were vacuum distilled until all the lower-boiling esters of fatty acids containing less than eighteen carbon atoms were removed, leaving substantially only methyl oleate, methyl linoleate and methyl stearate. Eighty-nine grams of this mixture were saponified with 10 moles of KOH and NaOH (5 moles of each). The saponified mass containing the excess alkali was heated to 280° C., maintained at about that temperature for twenty-five minutes, cooled, acidified with dilute $H_2SO_4$, and the fatty acids recovered therefrom. Upon fractionally distilling the methyl esters of these acids, they were found to be myristic (44%), oleic (46%) and stearic (10%). The fact that no palmitic acid was present indicated no conversion of oleic acid, but the presence of myristic acid in a quantity corresponding to the quantity of linoleic acid in the original mixture indicated complete conversion of the linoleic acid to myristic by the process.

*Example III*

The methyl esters obtained from 150 pounds of #2 tallow by alcoholysis were heated in a closed vessel to about 250° C., using superheated steam through an open coil to furnish both heat and agitation. Sixty pounds of a mixture of caustic potash and caustic soda (from a mixture made by mixing 395 pounds of 43° Bé. caustic potash and 207 pounds of 50° Bé. caustic soda) were added to the esters to saponify them. The balance of the mixture was then added slowly, over a two-hour period, with agitation. After the water and methanol were evaporated, the mixture was heated to 290° C. for one hour, and thereafter discharged into 500 pounds of water. The mixture of soaps and alkali separated into two layers, the upper layer consisting chiefly of soap, with some occluded alkali, and the lower layer of caustic lye substantially free of soap. The soaps were separated from the alkali liquor, and the fatty acids recovered and analyzed for iodine and thiocyanogen values. The following data shows the comparison of those values with the corresponding values of the esters before treatment:

|  | Iodine Value | Thiocyanogen Value | Per Cent Methyl Linoleate |
| --- | --- | --- | --- |
| Original esters | 46.77 | 43.52 | 3.7 |
| Acids from treated esters | 41.45 | 41.70 | nil |

The difference between the iodine value and the thiocyanogen value of an unsaturated acid or ester is substantially a measure of the polyunsaturated acids present. These analyses show that after treatment by this process, no polyunsaturated acids remained, while the oleic acid present was substantially unaffected.

The proportion and type of caustic alkali employed in this process may be varied, so long as an excess of alkali is present. Caustic soda, caustic potash and mixtures thereof are preferred. Any excess of the alkali is suitable, but two to ten moles in excess is a desirable proportion.

This process is not limited in any sense to the production of improved soaps, but may be followed to provide purified or stabilized acids for many purposes which will suggest themselves from a knowledge of the results obtainable by the process. Such a use is illustrated by this example: Olive oil is used extensively in salad dressings and other condiments or food compositions; but such compositions must be protected from becoming rancid, usually by keeping them under refrigeration. This precaution or protection is generally believed to be required because of the tendency of the linoleic acid in the olive oil to oxidize or become rancid. Now a highly desirable oil for food may be prepared by subjecting olive oil to the process of this invention, recovering the acids, and re-esterifying them with glycerine to produce a stable oil. Such an oil will not necessitate any precautions to protect it from becoming rancid. In the production of such a synthetic oil, the saturated acids produced in the process may be removed and the remaining acids esterfied with glycerine, or they may be "enriched" with oleic acid present in olive oil, or may contain a higher proportion of the saturated fatty acids than that in olive oil.

Thus it will be seen that synthetic oils may be produced containing the fatty acids desired therein in any combination or proportion involving oleic acid. For instance, a pure oleic acid oil may be produced, or one containing any desired proportion of oleic acid.

Soaps made by this process or from fatty acids treated by this process are particularly desirable for use in any process, composition or product in which other soaps are or have been used. Cosmetics, solutions, suspensions, treating baths, washing and cleansing operations, flotation processes, and the like, utilize these soaps to advantage.

The fatty acids produced by this process, either individually or in mixtures, are especially suitable for chemical processes, intermediates and final products. Since the poly-unsaturated fatty acids are converted to saturated fatty acids, the resulting mixture may be fractionally distilled without polymerization, may be more easily fractionally crystallized, or may be otherwise treated to separate the individual acids or certain groups thereof. It is preferable, however, to esterify the fatty acids with methyl or ethyl alcohol prior to distillation. These acids may be treated or reacted to form acid halides, nitriles, esters, etc., and the resulting products generally exhibit greater stability, better color, and a more pleasant odor or no odor at all.

Although the present invention has been described in connection with illustrative examples thereof, it will be understood by those skilled in the art that other variations and modifications of the invention can be made without departing from the principles disclosed herein.

I claim:

1. The process of stabilizing a mixture of fatty acids containing oleic acid and linoleic acid which comprises heating said mixture in the presence of an excess of alkali in the proportion of 2 to 10 mols of alkali per mol of fatty acids to a temperature of at least about 280° C. but below 310° C., and maintaining the temperature until the linoleic acid salt is substantially converted.

2. The process of stabilizing a mixture of fatty acids containing oleic acid and at least one polyunsaturated higher fatty acid which comprises subjecting an alkali salt thereof to a temperature of at least about 280° C. but below 310° C. in the presence of an excess of alkali in the proportion of 2 to 10 mols of alkali per mol of fatty acids.

3. The process of stabilizing a mixture of fatty acids containing oleic acid and at least 1 polyunsaturated higher fatty acid which comprises subjecting the alkali salts thereof in the presence of an excess of alkali in the proportion of 2 to 10 mols of alkali per mol of fatty acids to a temperature at which and for a time such that the polyunsaturated fatty acid salts are substantially converted to saturated fatty acid salts, said temperature being below 310° C.

4. The process of stabilizing soaps containing alkali salts of oleic and linoleic acids which comprises heating the soaps in the presence of an excess of alkali in the proportion of 2 to 10 mols of alkali per mol of fatty acids to a temperature of at least about 280° C. but below 310° C.

5. The process of recovering substantially pure oleic acid from a mixture containing oleic and polyunsaturated higher fatty acids which comprises saponifying said mixture of acids with alkali, subjecting the soap produced to a temperature of at least about 280° C. but less than 310° C. in the presence of an excess of alkali in the proportion of 2 to 10 mols of alkali per mol of fatty acids, and recovering the oleic acid therefrom.

6. The process of recovering substanaially pure oleic acid from a mixture containing oleic and polyunsaturated higher fatty acids which comprises saponifying said mixture of acids with alkali, subjecting the soap produced to a temperature of at least about 280° C. but less than 310° C. in the presence of an excess of alkali in the proportion of 2 to 10 mols of alkali per mol of fatty acids, acidifying and recovering the oleic acid.

7. The process of stabilizing soaps containing fatty acids found in tallow which comprises heating the soaps in the presence of an excess of alkali in the proportion of 2 to 10 mols of alkali per mol of fatty acids to a temperature of at least about 280° C. but below 310° C.

8. The process which comprises heating tallow fatty acids with a mixture of potassium hydroxide and sodium hydroxide in the ratio of 2 to 10 mols of the mixture of alkalis per mol of the fatty acids to a temperature of at least about 280° C. but below 310° C.

9. The process which comprises heating alkali salts of fatty acids comprising oleic and linoleic acids in the presence of an excess of alkali in the proportion of 2 to 10 mols of alkali per mol of fatty acids at a temperature of at least about 280° C. but less than 310° C. for a period of time sufficient to convert the linoleic acid salt to myristic acid salt but insufficient substantially to affect the oleic acid salt.

JOHN ROSS.

REFERENCES CITED

The following references are of record in the file of this patent:

UNITED STATES PATENTS

| Number | Name | Date |
|--------|------|------|
| 1,918,603 | Ittner | July 18, 1933 |
| 2,271,406 | Thurman | Jan. 27, 1942 |
| 2,382,530 | Auer | Aug. 14, 1945 |